June 28, 1932.　　D. P. FINNEY　　1,865,310
CONVEYER BELT
Filed Oct. 17, 1930
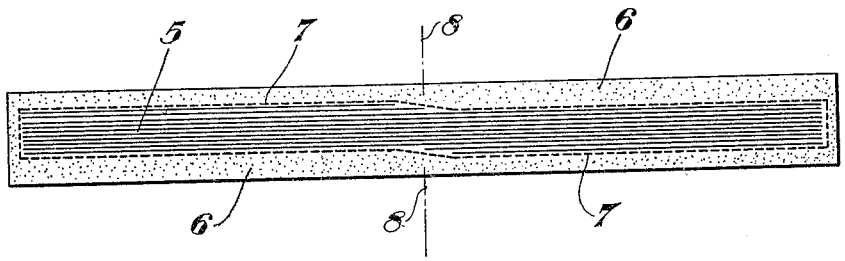
Inventor:
DAVID P. FINNEY,
by: Usina & Rauber
his Attorneys Patented June 28, 1932

1,865,310

UNITED STATES PATENT OFFICE

DAVID P. FINNEY, OF WILSON, PENNSYLVANIA

CONVEYER BELT

Application filed October 17, 1930. Serial No. 489,441.

This invention relates to conveyer belts generally and more particularly to conveyer belts for handling a material or materials whose physical or chemical state or composition results in unequal wear or deterioration of the cover of the belt, such, for example, as in by-product coke plants where rubber-covered belting is used for conveying hot and cold coke. Such latter form of belting has heretofore usually been constructed with a canvas or duck carcass to give it the necessary tensile strength and then covered with rubber to protect the carcass and withstand the wear imposed thereon by the material conveyed, some types of belts having an equal number of plies of duck and an equal thickness of rubber cover across their width on both the carrying and pulley-contacting sides, while other types have steps in the number of plies of duck and an increased thickness of rubber cover at the center on the carrying or material-contacting side. The number of plies of duck vary according to the desired strength while the rubber cover is made as thick as practical to increase the life of the belt.

As far as known, in all types of conveyer belting as heretofore devised, the belt may be considered as being constructed for uniform wear across its width, or on both sides of a center line taken longitudinally of the belt. Due to the manner of loading a belt or other causes, it frequently happens that the wear on the carrying or material-contacting side of the belt cover does not occur uniformly across the width of the belt, or on both sides of the longitudinal center of the belt, but may occur partly or totally to one side of this center line, with the result that only a portion of the carrying side cover is worn away and the balance discarded or thrown away, or the belt must be turned end for end to wear away the balance of the cover. Throwing away the unused portion of the cover or turning the belt end for end in most cases is quite expensive. Once the duck carcass is worn through, it offers very little resistance to wear and moisture or other vapors readily penetrate therethrough and cause rapid deterioration. Furthermore, in many instances, as in a by-product coke plant where the belt is ofttimes of considerable length, it is an expensive operation and often impracticable to turn the conveyer belt end for end after one side of the cover becomes worn.

The conveyer belt as herein disclosed overcomes the foregoing difficulties and greatly increases the life of the belt without necessitating an increase in thickness of the cover, nor is it necessary to turn the belt end for end to compensate for wear.

The drawing illustrates a belt in transverse vertical section constructed in accordance with the features of the invention.

Referring to the drawing, 5 designates the usual duck carcass and 6 the rubber cover which is usually lined interiorly with a layer of cider cloth as indicated at 7. The rubber cover as herein disclosed is of a particular design and this design accounts for the advantages of the belt over other types of belts as heretofore constructed.

Approximately at the longitudinal center 8 of the belt the cover 6 changes from a relatively thin to a relatively thick cross section. The greater thickness of rubber is placed on the side which will receive the greatest wear, and this portion of the cover may be termed a wear strip. The deviation in cross-sectional thickness occurs across the longitudinal central area of the belt, so that this portion of the belt retains its flexibility regardless of the thickness of the wear strip. On the other side of the belt this construction is reversed, the wear strip lying opposite the relatively thin cover section. Thus to change from one carrying surface to another, the belt need only be turned over instead of being turned end for end.

Practical experience and use has demonstrated that this type of belt construction approximately doubles the life of the belt.

What is claimed as new is:

1. A conveyer belt comprising an inner carcass portion of fabric or like material and an outer material carrying covering of rubber or like flexible material, said covering on one side of said belt being relatively thin in cross-section from one longitudinal edge inwardly to the longitudinal center line of said belt and relatively thick in cross-section from the longitudinal center line of said belt to the other edge, and the other side of said belt having a covering of relatively thick cross-section opposite said area of said thin covering on said first named side and a covering of relatively thin cross-section opposite said area of thick covering on said first named side.

2. A conveyer belt comprising an inner carcass portion of fabric or like material and an outer material carrying covering of rubber or like flexible material, said carcass being of substantially constant cross-section and being offset along its longitudinal center line so that the portion on one side of the longitudinal center line is materially above that on the other side of said line, said covering being applied to said carcass to form parallel top and bottom faces whereby the top portion of said covering will be thicker from one longitudinal edge of said belt inwardly to the longitudinal center line than from said longitudinal center line to the other longitudinal edge, and the bottom portion of said covering will be thin opposite the thick part of said top portion and thick opposite said thin part of said top portion.

3. A conveyer belt comprising an inner carcass portion and an outer material carrying covering, said covering being relatively thick on one side of said belt from the longitudinal center line outwardly to one longitudinal edge and on the other side from said longitudinal center line outwardly to the other longitudinal edge, and relatively thin portions of covering on each side of said belt opposite the thick portions on the opposite side.

4. A conveyer belt comprising an inner carcass portion and an outer covering, said belt having a substantially rectangular cross-section, said carcass being of constant cross-section and being offset along its longitudinal center line whereby said covering is thickest on opposite sides of said belt from said longitudinal center line to the opposite longitudinal edges.

5. A conveyer belt comprising an inner carcass portion and an outer covering, said belt having a substantially rectangular cross-section, said covering being relatively thick on one side of said belt from one longitudinal edge inwardly toward the longitudinal center line of said belt and on the other side from the other longitudinal edge inwardly toward the longitudinal center line of said belt, and relatively thin portions of covering on each side of said belt opposite the thick portions on the opposite side.

In testimony whereof, I have hereunto set my hand.

DAVID P. FINNEY.